United States Patent
Siirtola et al.

(10) Patent No.: US 6,631,173 B1
(45) Date of Patent: Oct. 7, 2003

(54) METHOD AND ARRANGEMENT FOR CALCULATING CORRELATION

(75) Inventors: Jouni Siirtola, Tampere (FI); Heli Väätäjä, Tampere (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/269,707

(22) PCT Filed: Oct. 14, 1997

(86) PCT No.: PCT/FI97/00624
§ 371 (c)(1),
(2), (4) Date: May 26, 1999

(87) PCT Pub. No.: WO98/17026
PCT Pub. Date: Apr. 23, 1998

(30) Foreign Application Priority Data

Oct. 16, 1996 (FI) .................................................. 964161

(51) Int. Cl.⁷ .............................. H04L 27/06; H04B 1/69
(52) U.S. Cl. ........................................ 375/343; 375/150
(58) Field of Search ................................ 375/343, 150, 375/142, 149, 130, 145; 370/441, 342, 335, 320; 708/422, 426, 313

(56) References Cited

U.S. PATENT DOCUMENTS

| | | | |
|---|---|---|---|
| 4,400,790 A | * 8/1983 | Chambers et al. | 375/150 |
| 4,538,281 A | 8/1985 | Rajan | 370/342 |
| 4,598,293 A | * 7/1986 | Wong | 342/201 |
| 5,305,349 A | * 4/1994 | Dent | 370/209 |
| 5,528,624 A | 6/1996 | Kaku et al. | 375/148 |
| 5,680,414 A | * 10/1997 | Durrant et al. | 370/515 |
| 5,768,306 A | * 6/1998 | Sawahashi et al. | 370/342 |
| 6,249,542 B1 | * 6/2001 | Kohli et al. | 375/148 |

* cited by examiner

Primary Examiner—Tesfaldet Bocure
(74) Attorney, Agent, or Firm—Pillsbury Winthrop LLP

(57) ABSTRACT

A method and arrangement for calculating correlation between a first and second code sequence, which comprise a number of samples and have a finite length is disclosed. The arrangement comprises an assembly for estimating the delay between the code sequences and an assembly for setting the codes to a desired phase with respect to each other on the basis of the delay between the code sequences by rotating the first sequence. To allow correlation to be calculated quickly and simply, the arrangement includes an assembly for comparing the sequences with each other in parallel mode sample by sample and an assembly for adding the results of the sample-specific comparisons together.

8 Claims, 3 Drawing Sheets

METHOD AND ARRANGEMENT FOR CALCULATING CORRELATION

FIELD OF THE INVENTION

A method for calculating correlation between a first and a second code sequence, which are previously known code sequences used in telecommunications systems, comprise a number of samples and have a finite length, and in which method the delay between the code sequences is calculated and the codes are set to a desired phase with respect to each other on the basis of the delay between the code sequences by rotating the first sequence.

BACKGROUND OF THE INVENTION

The present invention can be used for calculating auto/crosscorrelations between finite length sequences. The disclosed method and arrangement are applicable to any situation in which said correlations are to be calculated. The method can be particularly preferably applied to data transmission systems utilizing a direct sequence code division multiple access (DS-CDMA) method, in which systems correlations need to be calculated between differently delayed codes.

In the DC-CDMA the user's narrow-band data signal is modulated to a relatively wide band with a spreading code having a broader band than the data signal. In the used systems band widths from 1.25 MHz to 50 MHz have been employed. A spreading code usually consists of a long pseudo-random bit sequence. The bit rate of the spreading code is much higher than that of the data signal, and to distinguish it from data bits and data symbols the bits of the spreading code are called chips. The data symbol of each user is multiplied by all chips of a spreading code. The narrow-band data signal thus spreads to the frequency band utilized by the spreading code. Each user has a spreading code of his own. Several users simultaneously transmit over the same frequency band, and data signals are distinguished from one another in the receivers on the basis of the pseudo-random spreading code. However, different users' signals interfere with one another in the receiver, since the spreading codes are not completely orthogonal especially due to the phase shift caused by propagation delay.

In the CDMA systems the multiple access interference is reduced e.g. by means of multi-user detection (MUD) or interference cancellation methods. There are several such methods, but it is common to them that they need input information on the correlations between the outputs of the received signal.

According to the prior art, correlations between finite length sequences are typically calculated in serial mode one symbol at a time by using shift-register-based arrangements and by transmitting the sequence in a register forward between the calculations. The most significant drawback of the serial mode processing is its slowness, which becomes particularly apparent in telecommunications applications.

BRIEF DESCRIPTION OF THE INVENTION

An object of the present invention is to provide a method for calculating correlation, which allows calculation to be performed quickly with a simple arrangement.

This is achieved with the method described in the introduction, characterized in that the correlation between the sequences is calculated by comparing the sequences with each other sample by sample in parallel mode, and by adding the results of the sample-specific comparisons together.

The invention further relates to an arrangement for calculating correlation between a first and a second sequence, which are previously known code sequences used in telecommunications systems, comprise a number of samples and have a finite length, and which arrangement comprises means for estimating the delay between the code sequences and means for setting the codes to a desired phase with respect to each other on the basis of the delay between the code sequences by rotating the first sequence. The arrangement of the invention is characterized in that the arrangement comprises means for comparing the sequences with each other sample by sample in parallel mode, and means for adding the results of the sample-specific comparisons together.

The method and arrangement of the invention have several advantages. The correlation calculation implemented in parallel mode according to the invention is fast. The method can also be applied to cases in which the sequences to be correlated are of different lengths. When the invention is applied in telecommunications systems, the users' transmission rates may differ from one another.

BRIEF DESCRIPTION OF THE DRAWINGS

In the following, the invention will be described in greater detail with reference to the examples of the accompanying drawings, in which.

DETAILED DESCRIPTION OF THE INVENTION

In general, the invention can be used for calculating correlation between two sequences. The solution of the invention can be particularly preferably applied to radio systems utilizing the DS-CDMA, typically to cellular radio systems. In the following, the invention will be described by way of example in connection of cellular radio systems, without limiting the invention thereto. The disclosed principles of the invention can be easily applied in other connections, as will be clear to one skilled in the art.

Figure 1:
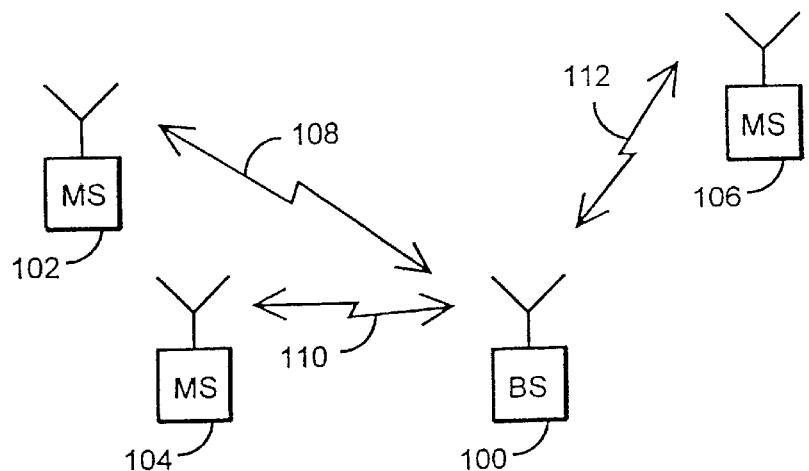
FIG. 1 illustrates an example of a data transmission system to which the solution of the invention can be applied, FIG. 2 generally illustrates the solution of the invention.

FIG. 1 illustrates one cell of the CDMA system by way of example. Each cell of the system typically comprises one base station 100, which is in contact to the subscriber terminals 102 to 106 which are within its area and which can be either mobile or fixed equipment. Each subscriber terminal 102 to 106 transmits and receives a signal 108 to 112 together with the base station. Each transmission is sent over the same frequency band, and the transmissions are distinguished from one another by means of spreading sequences which are different for each connection and by which the information to be transmitted has been multiplied.

Both the receiver of the terminal and the receiver of the base station receive a composite signal which not only comprises the desired signal but also other signals. When advanced methods of reception are utilized, such as interference cancellation or multi-user detection, there is need for calculating correlation between differently delayed codes.

Figure 2:
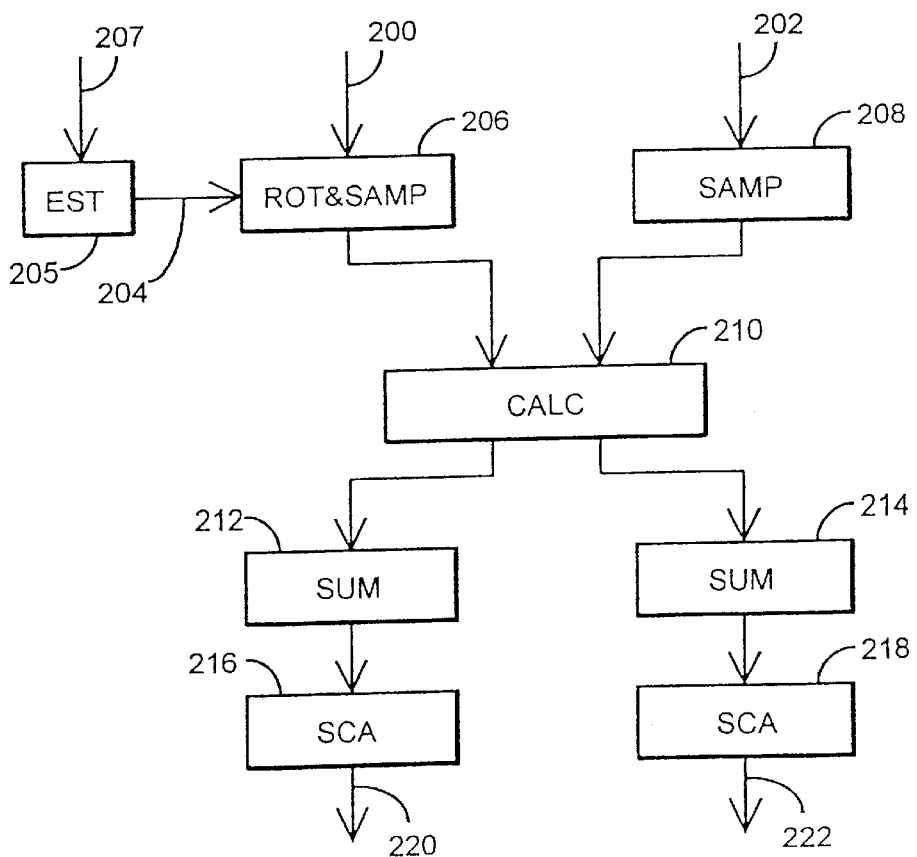

FIG. 2 generally illustrates the solution of the invention for calculating correlation. The input comprises two code sequences 200, 202 and the delay 204 between them. In the CDMA application it can be assumed that the sequence 202 is the desired user's sequence, and the sequence 200 is the interfering user's spreading code sequence. The sequences can be supplied to correlation calculation means e.g. from the memory means (not shown). The sequences are first supplied to preprocessing means 206, 208. The code sequence is set to the desired phase on the basis of the delay difference between the sequences, which delay difference 204 is input to the preprocessing means 206 from calculation means 205. The input 207 of the calculation means 205 comprises the delays of the codes 200, 202 with respect to a given reference. The desired phase can be provided e.g. by rotating the sequence in a register until the correct phase is achieved. In practice, rotation can also be implemented by means of a barrel shifter, which comprises multiplexers by means of which the sequence can be directly rotated to the correct phase without shift registers. In that case the time needed for rotating the sequence is constant. If desired, oversampling can also be performed in the preprocessing means e.g. in order to estimate the wave form.

Figure 3:
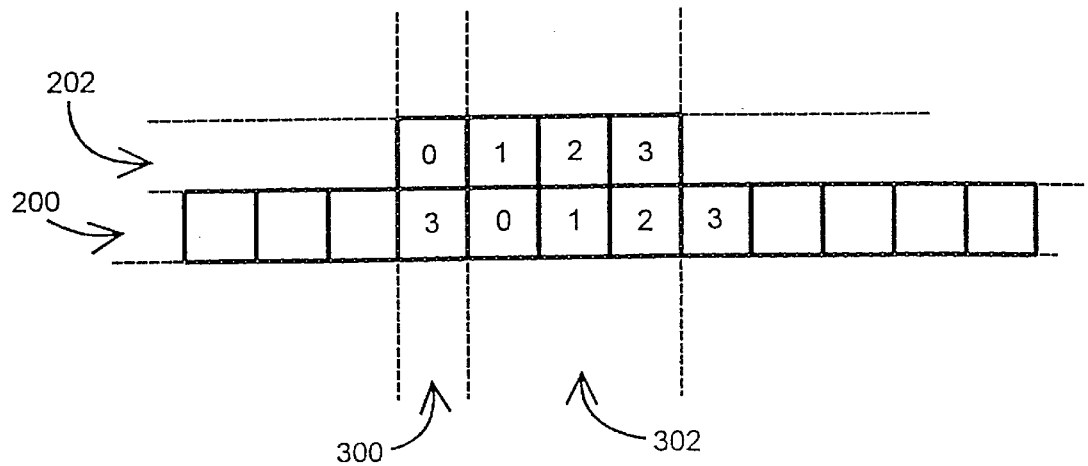
FIG. 3 illustrates an example of sequences in different phases with respect to one another.

Next phasing of code sequences will be described in greater detail by means of the example shown in FIG. 3. The figure shows two short code sequences 200, 202, which both are only four chips long for the sake of clarity. It is assumed that the sequences are the above-mentioned spreading codes of different users, and their measured delay difference is one symbol. In that case one sequence 200 is rotated so that its phase to the other sequence 202 is one chip long, i.e. according to the figure, the first chip '0' of the sequence 200 is at chip '1' of the other sequence 202. As a result of the rotation, the last chip '3' of the first sequence is at the first chip '0' of the second sequence 202. In the CDMA system the situation described above in practice means that the last chip '3' of the first sequence 200 is the last spreading code chip of the sequence used for multiplying the previous information symbol. In other words, the symbols partially overlap due to the delay.

We shall now return to FIG. 2. The phased sequences are supplied to comparison means which calculate the correlation between the sequences by comparing the sequences in parallel mode with one another sample by sample, i.e. the first sample of each sequence is compared with the sample of another sequence in the same position. The results obtained in the comparison are fed into the adder, the number of which may vary from one to two, depending on the implementation. The figure illustrates two adders 212 and 214. From the adders the result is supplied to scaling means 216, 218, in which the correlation result can be normalized to a desired area. One adder is used when one is interested only in the overlapping parts of a sequence, whereas two adders are used when one wants to obtain information on the partially overlapping symbols described above. The latter method is usually applied in CDMA applications. Alternatively, the summations required by the CDMA could be performed one after another with the same adder, provided that the delay caused is not detrimental. The scaled correlation results 220, 222 obtained from the scaling means 216, 218 are supplied to further utilization. In scaling, the modulation method and the size of the area to be examined are taken into account.

In the following, a preferred embodiment of the invention will be described in greater detail. The most straightforward way of calculating the correlation between the sequences is to multiply the sequences by each other sample by sample and to add the results together. Since the multiplication is complicated to carry out, a XOR function is used in the solution of the invention for measuring the equivalence between the sequences. The XOR function operates according to the table illustrated below as a parameter of two operators OP1, OP2 as follows: if the operators have the same value, the result is '0', and if the values are different, the result is '1'.

| OP1 | OP2 | Result |
| --- | --- | --- |
| 0 | 0 | 0 |
| 0 | 1 | 1 |
| 1 | 0 | 1 |
| 1 | 1 | 0 |

In the solution of the invention, the correlation of two sequences is calculated in such a manner that a XOR sum is calculated for the samples in the same position, and the equivalences (value 0) and the deviations (value 1) obtained are added together. The correlation between the sequences is obtained by subtracting the number of deviations from the number of equivalences. In practice, the calculation can be further simplified. A XOR sum is calculated for the chips in the same position, and the deviations obtained are added together. The correlation is obtained from this by subtracting the number of deviations multiplied by two from the number of chips (i.e. the size of the correlation area).

Next we shall take a look at an example of two code sequences, $s_k$ and $s_m$, both of which are four bits long:

$s_k$=0 1 0 1

$s_m$=1 0 0 0. Then $s_k XOR s_m$=1 1 0 1.

The number of deviations (value 1) is 3. This yields the unscaled correlation value 4−2*3=−2.

In the following, another preferred embodiment of the method of the invention will be described. This can be used when one wants to obtain information on the above-mentioned partially overlapping symbols. First, we shall examine FIG. 3 again. The figure shows two short code sequences 200, 202 the measured delay difference of which is one symbol. Correlation calculation is divided into two parts on the basis of the delay between the sequences. Since different information symbols partially overlap due to the delay, correlations R1, R2 are calculated separately for these symbols. The first part 300 comprises the sample pairs which precede the first symbol '0' of the rotated sequence (the figure shows only one sample pair). The other part 302 comprises the sample pairs which follow the first symbol '0' of the rotated sequence, said symbol being included. The division is based on the boundary of the information symbols of the rotated code sequence. In the figure there are three such sample pairs. The calculation of deviations described above is performed separately on these parts by means of the XOR sum.

Next we shall take a look at an example. The same two code sequences, sk and sm, which were discussed above will be used. In this case the delay between them is 1. The sequence sm has been rotated by one bit, and the symbol boundary is between the first and the second bit:

$s_k$=0 1 1 0 1

$s_m$=0 1 1 0 0. Then $s_k XOR s_m$=0 1 0 0 .

In the first part, which consists of only one bit, the number of deviations (value 1) is zero, and thus the value of correlation R1 is 1−2*0=1. In the second part the number of deviations (value 1) is 1. Thus the value of correlation R2 is 3−2*1=1.

Figure 4:
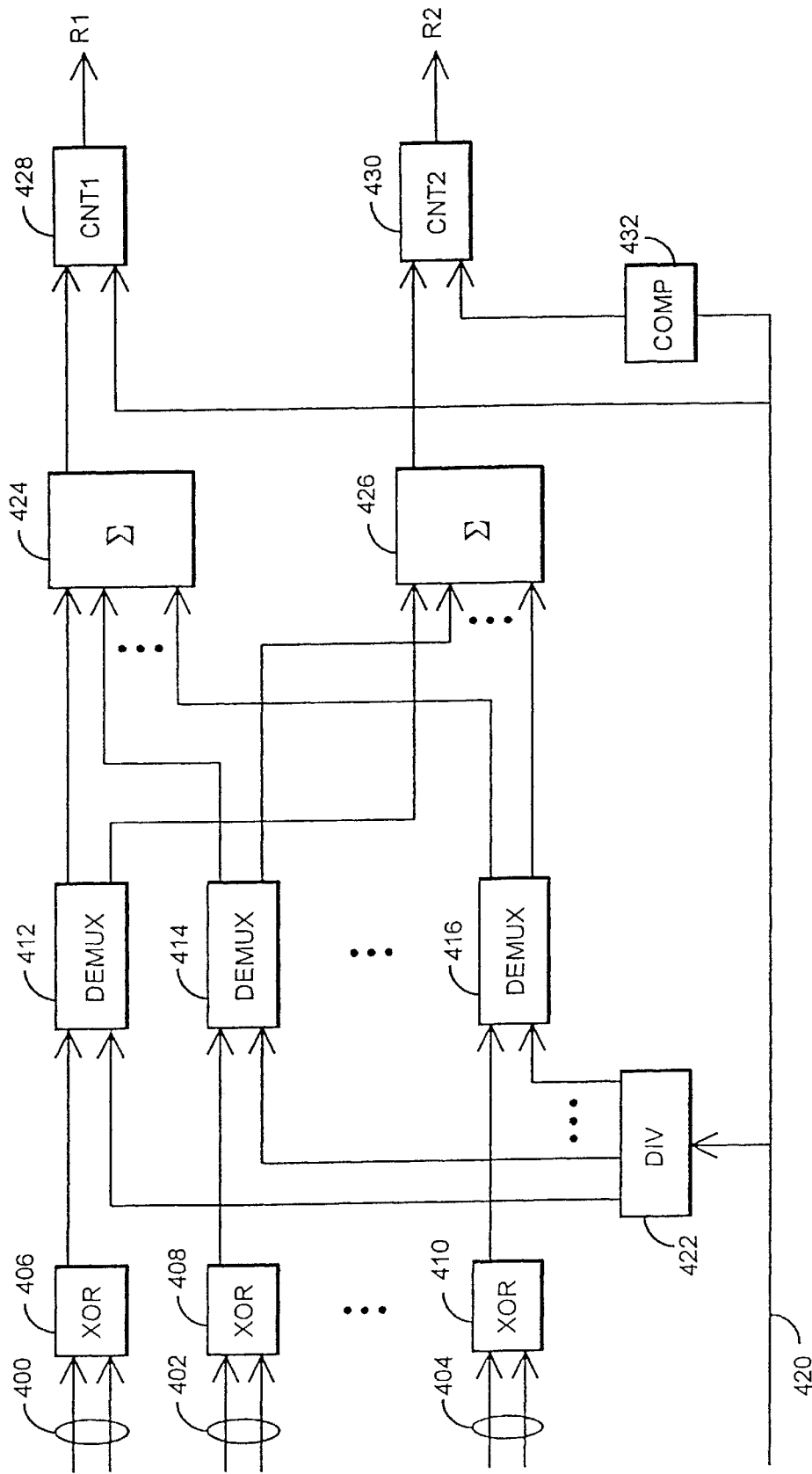
FIG. 4 illustrates an example of the arrangement according to the invention.

In the following, the arrangement implementing the method explained above will be described. This arrangement is illustrated in FIG. 4. The input comprises the values of sample pairs 400 to 404, which are supplied to a number of XOR gates 406 to 410. The outputs of the gates are supplied to the demultiplexing gates 412 to 416, from which the outputs of the counters are supplied either to the adder 424 of the first part or to the adder 426 of the second part, depending on which part the sample pair at the input of each counter belongs to. The output of the counting means 422 functions as the second input of the demultiplexing gates 412 to 416, which guides the demultiplexing gates. The delay 420 between the sequences is input to the counting means 422, which on the basis of the input calculate to which adder means the output of each XOR gate should be directed. The outputs of the adder means are supplied to the corresponding counters 428, 430, which calculate correlations for the parts on the basis of the sum information. The delay information 420 is also supplied to the counters; it is fed directly into the counter 428 of the first part, and through the gate 432 as two's complement into the counter 430 of the second part.

The calculation components described above can be implemented as such by using known components. The number of summation counters can be reduced to one, if so desired, provided that the sums of the different parts are calculated in sequence. This allows to simplify the arrangement, whereas the calculation delay increases.

Figure 5:
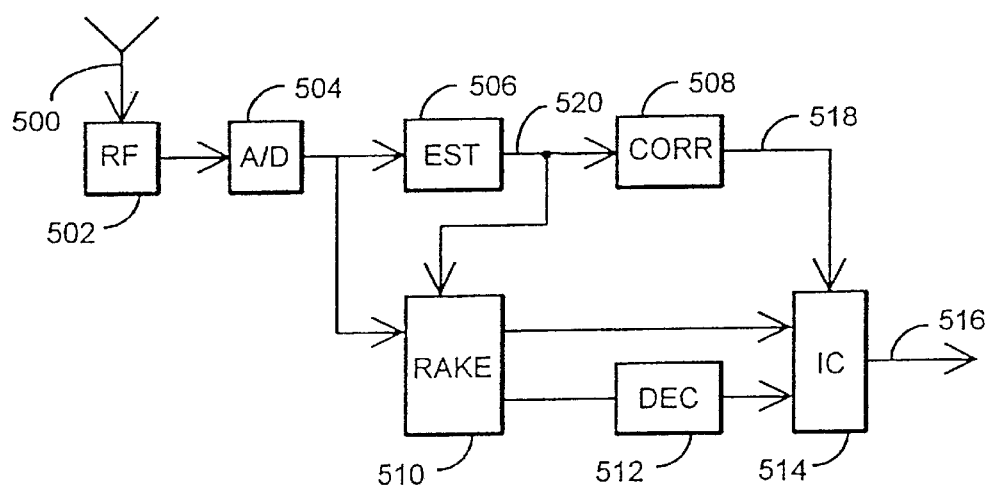
FIG. 5 illustrates an example of a CDMA receiver in which the solution of the invention is applied.

In the following, a CDMA receiver to which the solution of the invention is applied will be described by way of example. The block diagram in FIG. 5 illustrates the structure of the receiver. The receiver comprises an antenna 500 which receives a broadband signal which comprises summed signal components from various transmitters. A received signal is supplied to the radio frequency parts 502 which convert it to the base band. The converted signal is further fed into the sampling means 504 which convert the signal to a digital form. The converted signal is applied to the delay estimation block 506 in which delay differences between different signal components are estimated. The delay estimates 520 are supplied to the correlation means 508 which by utilizing the method of the invention calculate the correlations between the signals on the basis of the information on the delay difference. The delay estimates 520 and the converted signal are also supplied to the despreading means 510, which convert the signal to a narrow-band form. The output of the despreading means 510 is supplied both to the decision means 512 which make the conventional symbol decision, and interference removal means 514 to which the correlation results 518 and preliminary symbol decisions are supplied from the decision means 512. The interference cancellation means cancel interference and their output signal 516 is supplied further to the other parts of the receiver for final detection.

Even though the invention has been described above with reference to the examples according to the accompanying drawings, it is clear that the invention is not restricted thereto, but it can be modified in several ways within the scope of the inventive idea disclosed in the appended claims.

What is claimed is:

1. A method for calculating correlation between a first and a second code sequence, which are previously known code sequences used in telecommunications systems, each code sequence including a number of samples and having a finite length, the method comprising:

calculating a delay between the code sequences;

setting the code sequences to a desired phase with respect to each other based on the delay between the code sequences by rotating the first code sequence;

calculating the correlation between the set-to-the-desired-phase code sequences using a single correlator, which compares the set-to-the-desired-phase code sequences with each other in parallel mode sample by sample, and by adding the results of sample-specific comparisons together, wherein the samples of the code sequences are binary symbols, and the set-to-the-desired-phase code sequences are compared with each other by calculating a number of deviations of the samples in the same position and by subtracting the number of deviations multiplied by two from a size of a correlation area.

2. The method of claim 1, wherein, during the calculating the correlation of the samples, samples from a beginning of the second code sequence to a beginning of the unrotated first code sequence, and samples from a beginning of the first unrotated code sequence to an end of the second code sequence are calculated and summed separately.

3. The method of claims 2, wherein the comparisons to be carried out separately in parallel mode are performed in sequence in serial mode.

4. The method of claim 1, further comprising performing oversampling on the code sequences before the comparison is performed.

5. The method of claim 1, wherein the code sequences to be compared are of different lengths.

6. The method of claim 1, wherein the code sequences are used as different users' spreading codes in CDMA data transmission systems.

7. An arrangement for calculating correlation between a first and a second code sequence, which are previously known code sequences used in telecommunications systems, each code sequence including a number of samples and having a finite length, which arrangement comprises:

means for estimating a delay between the code sequences;

means for setting the code sequences to a desired phase with respect to each other based on the delay between the code sequences by rotating the first code sequence;

a single correlator for comparing the set-to-the-desired-phase code sequences with each other, in parallel mode, sample by sample, wherein the single correlator includes means for detecting deviations of samples in the same position;

means for adding the results of the sample-specific comparisons together;

means for calculating deviations of the samples from a beginning of the second code sequence to a beginning of the unrotated first code sequence;

means for calculating deviations of the samples from a beginning of the unrotated first code sequence to an end of the second code sequence; and means for calculating corresponding correlations.

8. The arrangement of claim 7, further comprising means for performing oversampling on the code sequences before the comparison.

* * * * *